(12) United States Patent
Pinera

(10) Patent No.: US 8,250,853 B1
(45) Date of Patent: Aug. 28, 2012

(54) HYBRID EXPANDER CYCLE ROCKET ENGINE

(75) Inventor: Alex Pinera, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 356 days.

(21) Appl. No.: 13/028,429

(22) Filed: Feb. 16, 2011

(51) Int. Cl.
*F02K 5/00* (2006.01)
(52) U.S. Cl. .......................................... 60/246; 60/267
(58) Field of Classification Search .................. 60/246,
60/257, 259, 260, 266, 267; 239/127.1, 127.3
See application file for complete search history.

(56) References Cited

U.S. PATENT DOCUMENTS

| | | | | |
|---|---|---|---|---|
| 3,170,295 A | * | 2/1965 | Dryden | 60/39.48 |
| 4,771,599 A | * | 9/1988 | Brown et al. | 60/258 |
| 4,771,600 A | * | 9/1988 | Limerick et al. | 60/258 |
| 4,831,818 A | * | 5/1989 | Martin | 60/204 |
| 4,998,410 A | * | 3/1991 | Martinez-Leon et al. | 60/259 |
| 5,444,973 A | * | 8/1995 | Limerick et al. | 60/204 |
| 7,389,636 B2 | * | 6/2008 | Fowler et al. | 60/204 |
| 7,900,436 B2 | * | 3/2011 | Greene | 60/260 |

* cited by examiner

*Primary Examiner* — Phutthiwat Wongwian
(74) *Attorney, Agent, or Firm* — John Ryznic

(57) ABSTRACT

A hybrid expander cycle rocket engine with separate turbopumps for a fuel and an oxidizer, where the fuel pump is driven by gaseous fuel passed from the fuel pump and through a heat exchanger formed within the nozzle or combustion chamber and passed through the fuel turbine and then into the combustion chamber. The oxidizer turbopump is driven by the gas generator with the fuel diverted from the fuel pump and burned with some of the oxidizer from the oxidizer pump.

6 Claims, 5 Drawing Sheets

HYBRID EXPANDER CYCLE ROCKET ENGINE

GOVERNMENT LICENSE RIGHTS

None.

CROSS-REFERENCE TO RELATED APPLICATIONS

None.

BACKGROUND OF THE INVENTION

1. Field of the Invention

The present invention relates generally to an expander cycle rocket engine, and more specifically to an expander cycle rocket engine with a gas generator.

2. Description of the Related Art Including Information Disclosed Under 37 CFR 1.97 and 1.98

The expander cycle is a power cycle of a bipropellant rocket engine meant to improve the efficiency of fuel delivery. The expander cycle rocket engine is shown in FIG. 1. In an expander cycle, the fuel is heated before it is combusted, usually with waste heat from the main combustion chamber. As the liquid fuel passes through coolant passages in the walls of the combustion chamber, it undergoes a phase change into a gaseous state. The fuel in the gaseous state expands through a turbine using the pressure differential from the supply pressure to the ambient exhaust pressure to initiate turbopump rotation. This can provide a bootstrap starting capability as is used on the Pratt & Whitney RL10 engine. This bootstrap power is used to drive turbines that drive the fuel and oxidizer pumps increasing the propellant pressures and flows to the rocket engine thrust chamber. After leaving the turbine(s), the fuel is then injected with the oxidizer into the combustion chamber and burned to produce thrust for the vehicle.

FIG. 2 shows the prior art RL-10 engine with a gear 3 to drive the LOX pump 4 off of the LH2 turbopump 5 drive shaft 3. Liquid hydrogen from the LH2 pump 5 is passed through a heat exchanger in the nozzle and vaporized, and then passed through a turbine 6 that drives both pumps. Because of the single shaft used in the FIG. 1 design, there must be an inter-propellant seal between the two liquids (the fuel and the oxidizer) to prevent mixing. These have historically been a design challenge due to the high cost of failure for the component.

Because of the necessary phase change, the expander cycle is thrust limited by the square-cube rule. As the size of a bell-shaped nozzle increases with increasing thrust, the nozzle surface area (from which heat can be extracted to expand the fuel) increases as the square of the radius. However, the volume of fuel that must be heated increases as the cube of the radius. Thus there exists a maximum engine size of approximately 300 kN of thrust beyond which there is no longer enough nozzle area to heat enough fuel to drive the turbines and hence the fuel pumps. Higher thrust levels can be achieved using a bypass expander cycle where a portion of the fuel bypasses the turbine and or thrust chamber cooling passages and goes directly to the main chamber injector. Aerospike engines do not suffer from the same limitations because the linear shape of the engine is not subject to the square-cube law. As the width of the engine increases, both the volume of fuel to be heated and the available thermal energy increase linearly, allowing arbitrarily wide engines to be constructed.

All expander cycle engines need to use a cryogenic fuel such as hydrogen, methane, or propane that easily reach their boiling points.

Some expander cycle engine may use a gas generator of some kind to start the turbine and run the engine until the heat input from the thrust chamber and nozzle skirt increases as the chamber pressure builds up.

In an open cycle, or "bleed" expander cycle, only some of the fuel is heated to drive the turbines, which is then vented to atmosphere to increase turbine efficiency. While this increases power output, the dumped fuel leads to a decrease in propellant efficiency (lower engine specific impulse). A closed cycle expander engine sends the turbine exhaust to the combustion chamber.

The gas generator cycle is a power cycle of a bipropellant rocket engine. FIG. 3 shows a gas generator cycle rocket engine. Some of the propellant is burned in a gas-generator 4 and the resulting hot gas is used to power the engine's pumps. The gas is then exhausted. Because something is "thrown away" this type of engine is also known as open cycle.

There are several advantages to the gas generator cycle over its counterpart, the staged combustion cycle. The gas generator turbine does not need to deal with the counter pressure of injecting the exhaust into the combustion chamber. This allows the turbine to produce more power and increase the pressure of the fuel and combustion chamber, thus increasing specific impulse or efficiency; this also reduces wear on the turbine, increasing its reliability, reducing its production cost and increasing its operational life-span (particularly advantageous for reusable rockets).

The main disadvantage is lost efficiency due to discarded propellant, though this efficiency loss can be outweighed in production engines by the higher chamber pressure's increase in net efficiency. Even so a gas generator cycle tends to have lower specific impulse than a staged combustion cycle.

As in most cryogenic rocket engines, some of the fuel in a gas-generator cycle is used to cool the nozzle and combustion chamber. Current construction materials cannot stand extreme temperatures of rocket combustion processes by themselves. Cooling permits the use of rocket engines for relatively longer periods of time with today's material technology. Without rocket combustion chamber and nozzle cooling, the engine would fail catastrophically.

BRIEF SUMMARY OF THE INVENTION

A hybrid expander cycle rocket engine with separate turbo pumps for the liquid fuel and the liquid oxidizer each driven by a turbine. The liquid fuel turbopump is driven by vaporizing the liquid fuel in a nozzle heat exchanger and then passing the vaporized fuel through the turbine and then into the combustion chamber. A regulating valve controls an amount of vaporized fuel that can bypass the turbopump in order to regulate the turbopump pressure. The liquid oxidizer turbopump is driven by an oxygen rich gas generator in which some of the liquid fuel is diverted into the gas generator and burned with some of the liquid oxidizer diverted from the combustion chamber. The resulting hot gas flow from the gas generator is used to drive the oxidizer turbopump and is then discharged into the nozzle or into the atmosphere.

With the hybrid expander cycle rocket engine, no inter-propellant seal is required and therefore no external purge gas is required so that the engine or vehicle weight can be decreased. A smaller chamber can be formed because less work is required from the expander. A smaller chamber for a third stage rocket engine will allow for a significant decrease in the size and weight of the rocket.

DETAILED DESCRIPTION OF THE INVENTION

Figure 1:
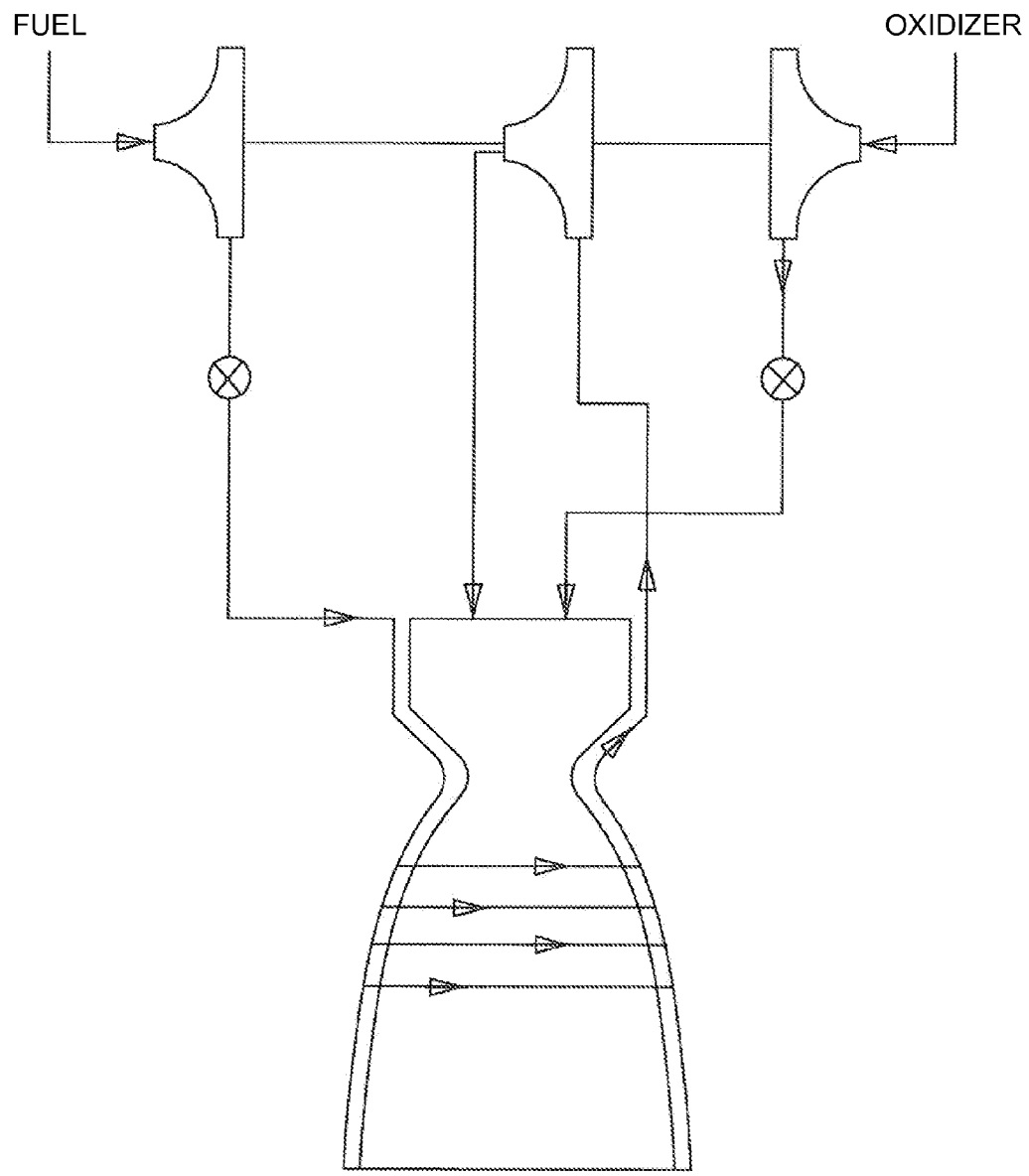
FIG. 1 shows a schematic view of an expander cycle rocket engine of the prior art.
Figure 2:
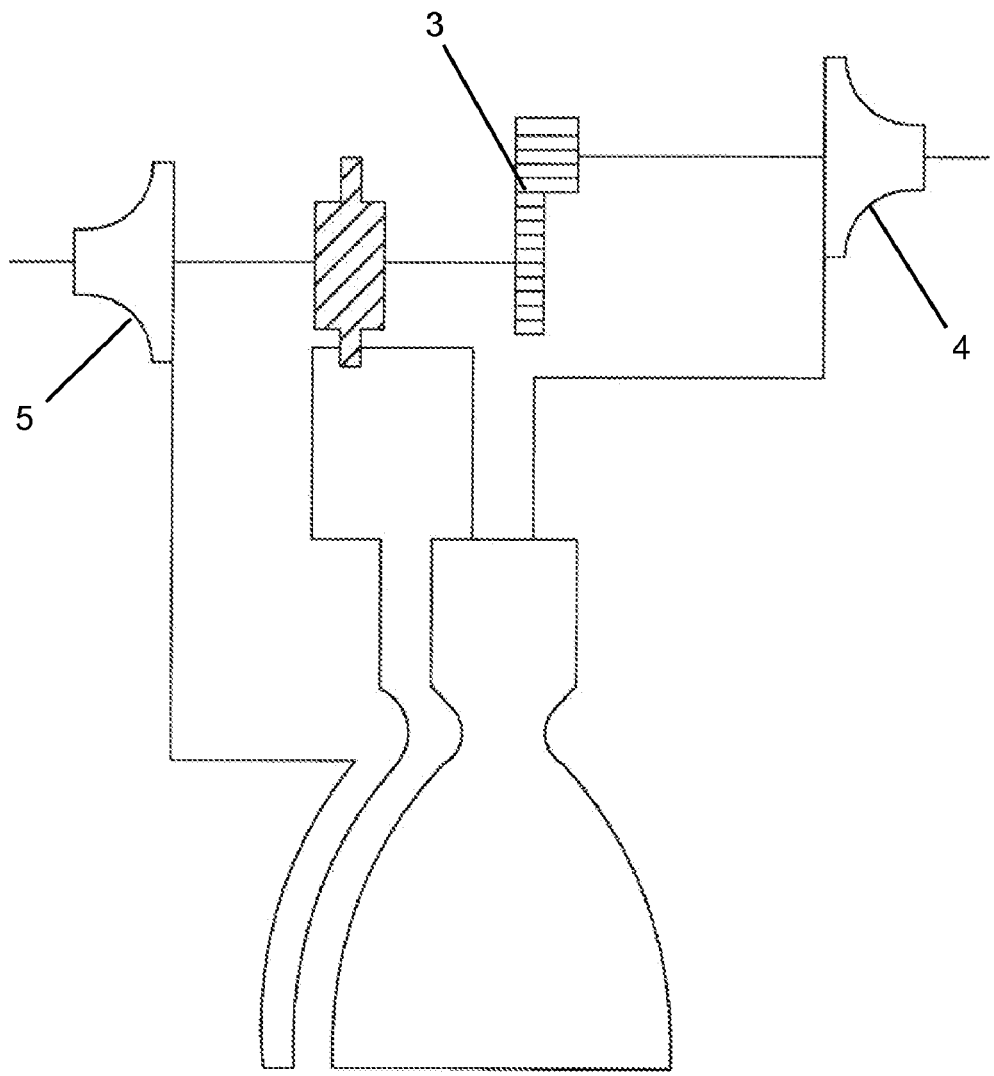
FIG. 2 shows a schematic view of a gas generator cycle rocket engine with a gear box between the fuel pump and the oxidizer pump.
Figure 3:
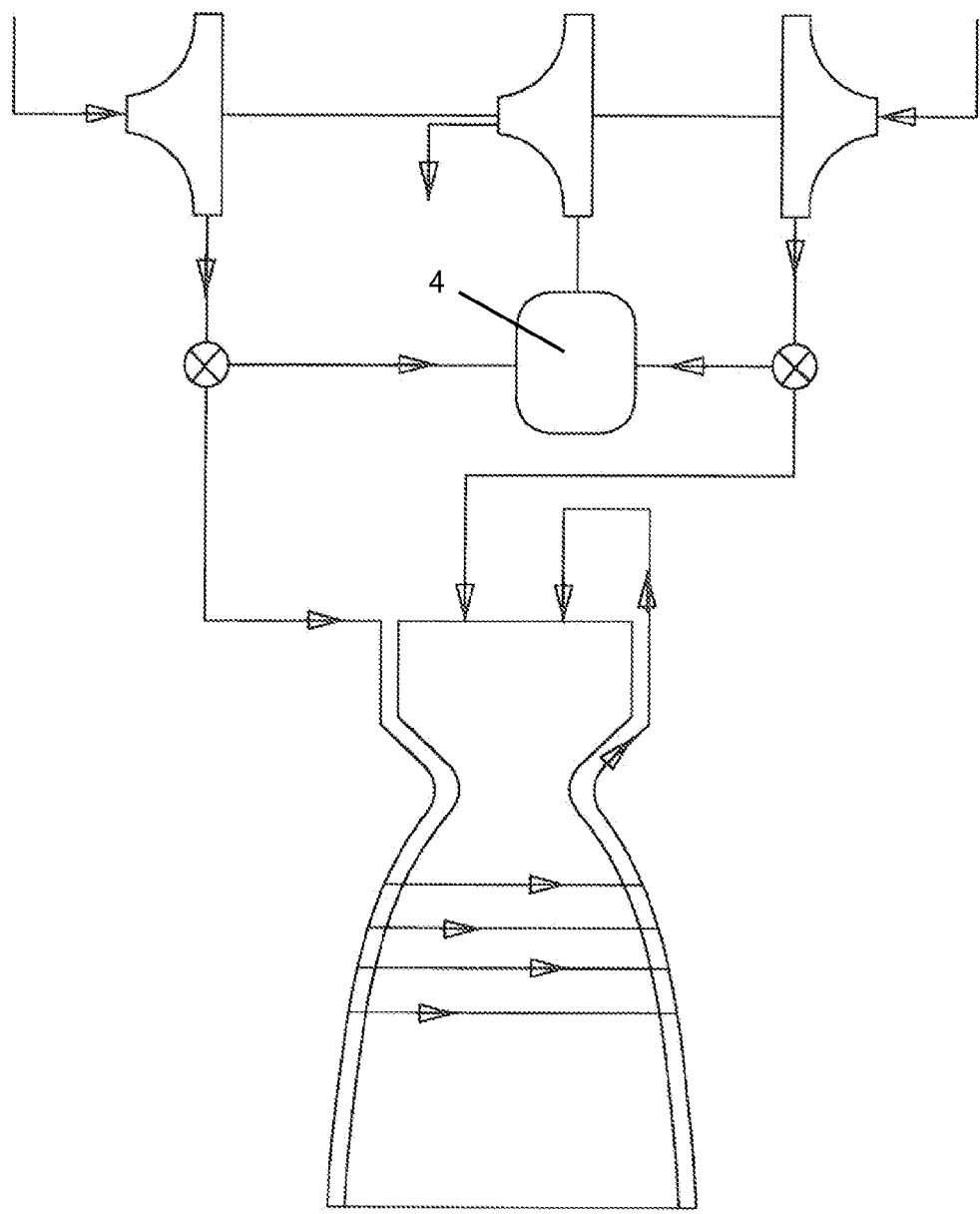
FIG. 3 shows a schematic view of a gas generator cycle rocket engine of the prior art.
Figure 4:
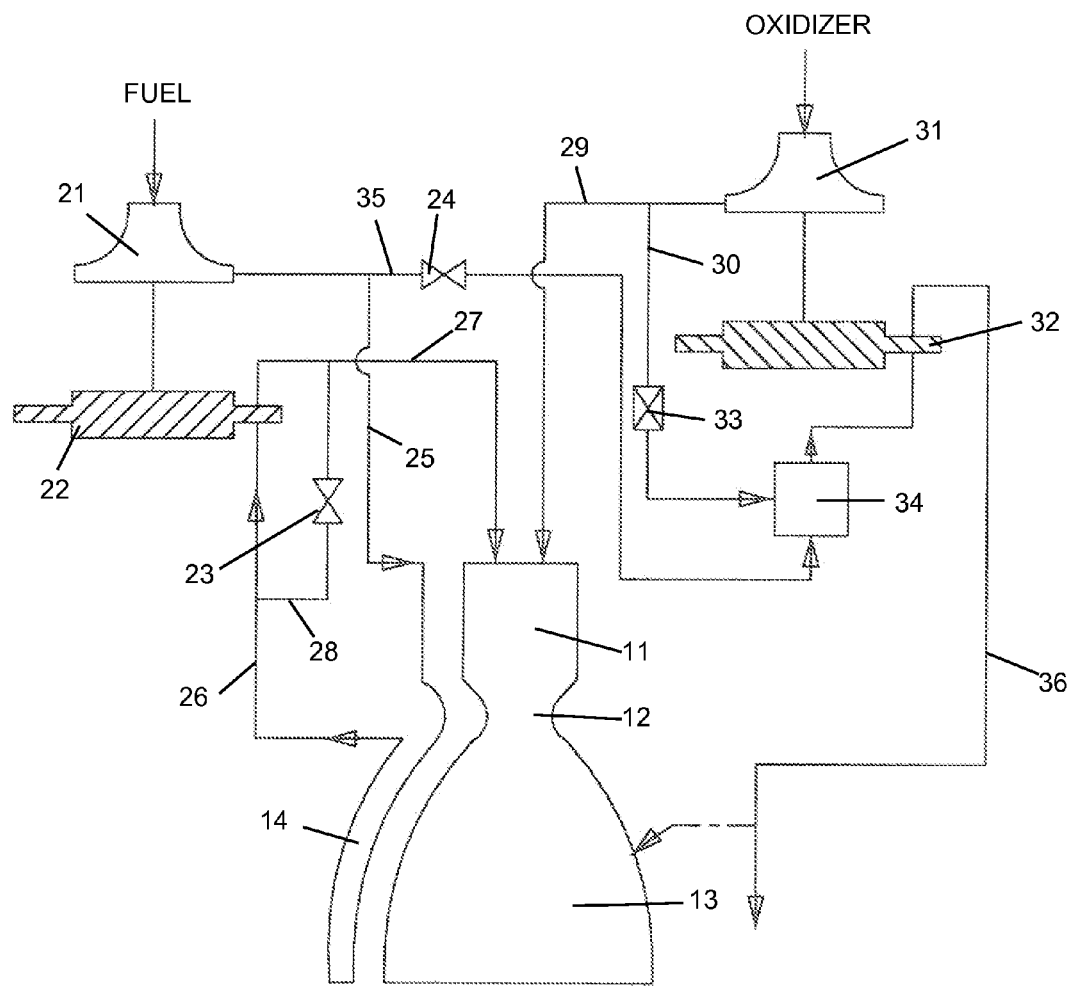
FIG. 4 shows a schematic view of the hybrid expander cycle rocket engine of a first embodiment of the present invention with a gas generator driving the oxidizer turbopump.

The expander cycle rocket engine of the present invention is shown in FIG. 4 and includes a combustion chamber connected by a throat 12 to a nozzle 13 that generates thrust from burning a fuel with an oxidizer in the combustion chamber 11. A fuel turbopump includes a centrifugal pump 21 driven by a turbine 22. An oxidizer turbopump includes a centrifugal pump 31 driven by a turbine 32.

The output of the fuel pump 21 delivers liquid fuel via a first fuel line 25 to a heat exchanger 14 formed around the combustion chamber 11 of the nozzle 13 to convert the liquid fuel into a gaseous fuel which is then passed through the turbine 22 to drive the pump 21 via a second fuel line 26. The gaseous fuel from the turbine 22 is then discharged into the combustion chamber 11 in a third fuel line 27. A fuel bypass control valve 23 disposes on a bypass line 28 to allow for a select amount of the gaseous fuel to bypass the turbine 22 and flow directly into the combustion chamber 11.

The oxidizer pump 31 pumps liquid oxidizer directly into the combustion chamber 11 via a first oxidizer line 29. A liquid oxidizer orifice 33 bleeds of a portion of the liquid oxidizer from the pump 31 outlet and passes the liquid oxidizer into a gas generator 34 via a second oxidizer line 30. A gas generator mixture ratio control valve 24 diverts a portion of the liquid fuel from the liquid fuel pump 21 into the gas generator 34 via a fuel pump to gas generator line 35 to burn with the oxidizer and produces a hot gas flow. The hot gas flow from the gas generator 34 is passed through the oxidizer turbine 32 to drive the oxidizer pump 31. The exhaust from the oxidizer turbine 32 is discharged into the atmosphere or into the nozzle 13 or both via an oxidizer turbine exhaust line 36.

Figure 5:
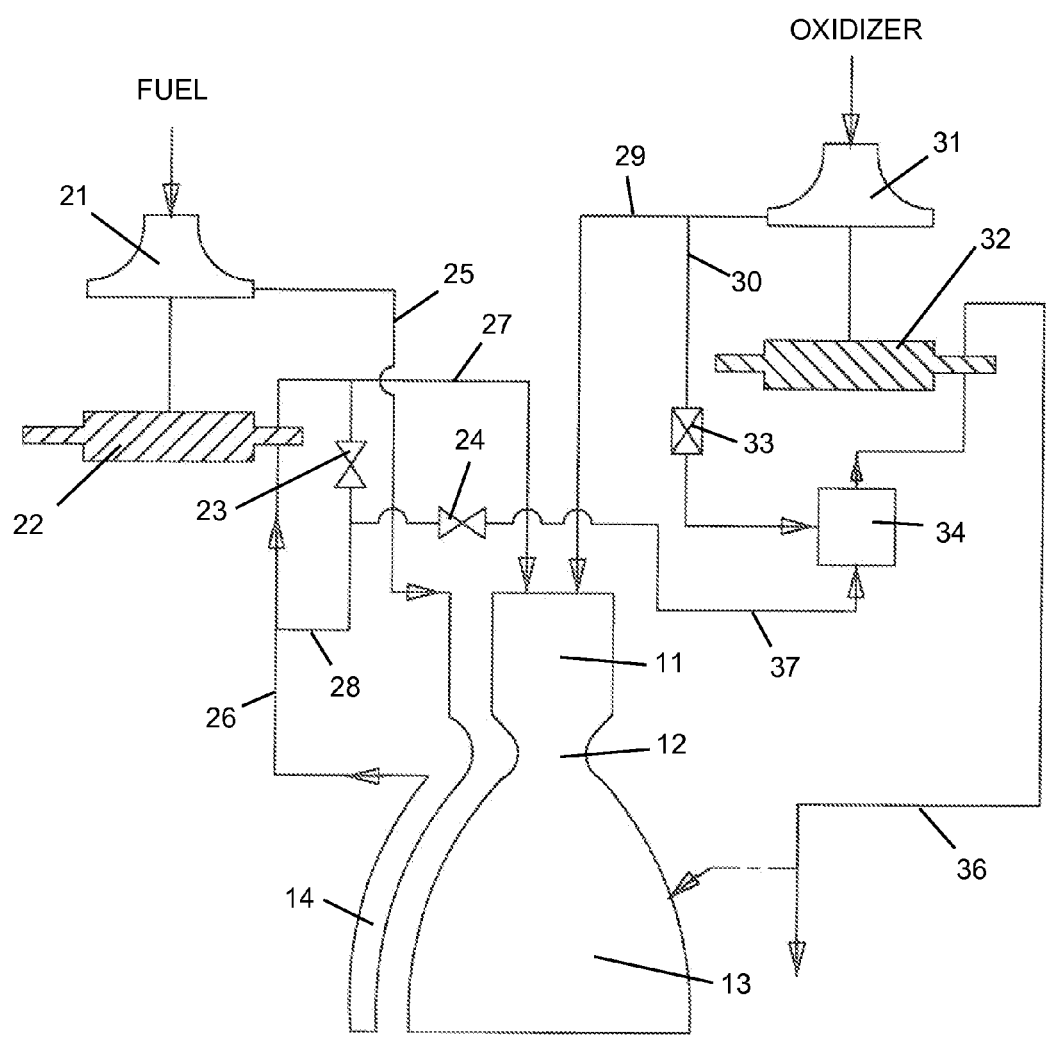
FIG. 5 shows a schematic view of the hybrid expander cycle rocket engine of a second embodiment of the present invention with a gas generator driving the oxidizer turbopump.

A second embodiment of the hybrid expander cycle rocket engine of the present invention is shown in FIG. 5. In the FIG. 4 embodiment, the fuel supplied from the fuel pump to the gas generator is in liquid form. In the FIG. 5 embodiment, the liquid fuel is first passed through the heat exchanger in the nozzle to vaporize the fuel before passing into the gas generator via a fuel pump to gas generator line. Thus, the efficiency of the gas generator is increased in the FIG. 5 embodiment. The gas generator mixture ratio control valve 24 is located in a fourth fuel line 37 connected to the bypass fuel line 28 just upstream from the bypass valve 23 and discharges into the gas generator 34. In the FIG. 5 embodiment, the liquid fuel from the fuel pump all passes through the nozzle heat exchanger 14 via the first fuel line 25 and is vaporized, and then some of the fuel that does not pass through the fuel turbine flows into the gas generator and is burned with the liquid oxidizer. The fourth fuel line 37 for the gas generator could be connected to the second fuel line 26 between the nozzle heat exchanger 14 and the turbine bypass fuel line 28 instead of in the fuel turbine bypass line 28 because the fuel pressure is the same in either line.

In one embodiment of the present invention, the fuel can be liquid hydrogen (LH2) or liquid methane (CH4) and the oxidizer can be liquid oxygen (LOX). The gaseous fuel control valve 23 regulates an amount of gaseous fuel that is passed through the fuel turbine 22 and therefore the pressure and volume of liquid fuel pumped by the fuel pump 21. The oxidizer orifice 33 is sized to divert a specific amount of liquid oxidizer into the gas generator 34 to burn with the liquid fuel that is diverted from the fuel pump through the gas generator main relief valve 24. The gas generator mixture ratio control valve 24 can regulate the amount of liquid fuel supplied to the gas generator 34 and therefore control the temperature of combustion product used to drive the oxidizer turbopump.

With the hybrid expander cycle rocket engine of the present invention, no inter-propellant seal assembly is required and therefore no external purge gas is needed or the purge gas supply tank and additional delivery hardware (e.g., plumbing, valving, ect.). Therefore, the weight of the rocket engine is reduced. A smaller chamber can also be used since less work is needed from the expander. Especially for use as a second or third stage rocket engine, the nozzle can be made much shorter and therefore the rocket size is decreased and the weight is reduced compared to the prior art rocket engines.

I claim the following:

1. A hybrid expander cycle rocket engine comprising:
a combustion chamber connected to a nozzle through a throat;
a fuel pump driven by a fuel turbine;
an oxidizer pump driven by an oxidizer turbine;
a heat exchanger formed within the combustion chamber of the nozzle to convert a liquid into a gas;
a first fuel line connecting an output of the fuel pump to an inlet of the heat exchanger;
a second fuel line connecting an outlet of the heat exchanger to an inlet of the fuel turbine;
a third fuel line connecting an outlet of the fuel turbine to an inlet of the combustion chamber;
a fuel bypass line with an inlet end connected to the second fuel line and an outlet end connected to the third fuel line and bypassing the fuel turbine;
a bypass regulating valve connected in the fuel bypass line to regulate an amount of fuel that bypasses the fuel turbine;
a first oxidizer line connecting an outlet of the oxidizer pump to an inlet of the combustion chamber;
a second oxidizer line connecting an outlet of the oxidizer pump to a gas generator;
a fuel pump to gas generator line to supply some of the fuel to the gas generator; and,
a gas generator line connecting an outlet of the gas generator to an inlet of the oxidizer turbine.

2. The hybrid expander cycle rocket engine of claim 1, and further comprising:
an orifice located in the second oxidizer line.

3. The hybrid expander cycle rocket engine of claim 1, and further comprising:

an oxidizer turbine exhaust line connecting the oxidizer turbine outlet to the nozzle or atmosphere or both the nozzle and the atmosphere.

4. The hybrid expander cycle rocket engine of claim 1, and further comprising:

the hybrid expander cycle rocket engine is without an inter-propellant seal.

5. The hybrid expander cycle rocket engine of claim 1, and further comprising:

the fuel pump to gas generator line includes:

a gas generator mixture ratio control valve located in the fuel pump to gas generator line to regulate an amount of fuel discharged from the fuel pump into the gas generator.

6. The hybrid expander cycle rocket engine of claim 1, and further comprising:

the fuel pump to gas generator line includes:

a fourth fuel line connecting the fuel bypass line or the second fuel line to the gas generator; and, a gas generator mixture ratio control valve located in the fourth fuel line to regulate an amount of fuel discharged from the fuel pump into the gas generator.

\* \* \* \* \*